(12) United States Patent
Ohma et al.

(10) Patent No.: US 12,074,438 B2
(45) Date of Patent: Aug. 27, 2024

(54) HIGH VOLTAGE AC TRANSMISSION SYSTEMS AND METHODS

(71) Applicant: AKER SOLUTIONS AS, Lysaker (NO)

(72) Inventors: Havar Forsell Ohma, Oslo (NO); Ole Johan Bjerknes, Oslo (NO); Bjoern Erik Strand, Oslo (NO)

(73) Assignee: AKER SOLUTIONS AS, Lysaker (NO)

( * ) Notice: Subject to any disclaimer, the term of this patent is extended or adjusted under 35 U.S.C. 154(b) by 29 days.

(21) Appl. No.: 17/795,880

(22) PCT Filed: Jan. 29, 2021

(86) PCT No.: PCT/NO2021/050029
§ 371 (c)(1),
(2) Date: Jul. 28, 2022

(87) PCT Pub. No.: WO2021/154092
PCT Pub. Date: Aug. 5, 2021

(65) Prior Publication Data
US 2023/0163592 A1    May 25, 2023

(30) Foreign Application Priority Data

Jan. 30, 2020  (GB) ...................................... 2001259
Jan. 30, 2020  (GB) ...................................... 2001260

(51) Int. Cl.
*H02J 3/00*   (2006.01)
*F17D 1/18*   (2006.01)
*H02J 3/22*   (2006.01)
*H02J 3/38*   (2006.01)
*H02J 13/00*  (2006.01)

(52) U.S. Cl.
CPC ............ *H02J 3/00125* (2020.01); *F17D 1/18* (2013.01); *H02J 3/22* (2013.01); *H02J 3/381* (2013.01); *H02J 13/00002* (2020.01); *H02J 2300/28* (2020.01)

(58) Field of Classification Search
CPC .. H02J 3/001225; H02J 13/00002; H02J 3/22; H02J 3/381; H02J 2300/28; F17D 1/18
See application file for complete search history.

(56) References Cited

U.S. PATENT DOCUMENTS

2011/0036560 A1 *  2/2011  Vail, III ................ E21B 33/126
                                                       166/177.6
2018/0163910 A1    6/2018  Hatlo et al.

FOREIGN PATENT DOCUMENTS

| EP | 2 624 403 | A1 |   | 8/2013 |   |
|----|-----------|-----|---|--------|---|
| EP | 2624403   | A1 | * | 8/2013 | ............. F16L 53/37 |
| EP | 3 337 290 | A1 |   | 6/2018 |   |

(Continued)

*Primary Examiner* — Jared Fureman
*Assistant Examiner* — Duc M Pham
(74) *Attorney, Agent, or Firm* — Norman B. Thot

(57) ABSTRACT

An AC transmission system for a power transmission to an offshore plant. The AC transmission system includes an onshore power station which transmits an electric power, an offshore plant which receives the electric power, a submarine cable which connects the onshore power station to the offshore plant, and at least one pipeline with an electrical heating system which is connected to the onshore power station through the submarine cable.

10 Claims, 4 Drawing Sheets

(56) References Cited

FOREIGN PATENT DOCUMENTS

| JP | 2015080404 A | * | 4/2015 | ............... | G05F 3/04 |
| WO | WO 2007/011230 A1 | | 1/2007 | | |
| WO | WO-2007011230 A1 | * | 1/2007 | ............. | E21B 43/01 |
| WO | WO 2014/079508 A1 | | 5/2014 | | |

* cited by examiner

HIGH VOLTAGE AC TRANSMISSION SYSTEMS AND METHODS

CROSS REFERENCE TO PRIOR APPLICATIONS

This application is a U.S. National Phase application under 35 U.S.C. § 371 of International Application No. PCT/NO2021/050029, filed on Jan. 29, 2021 and which claims benefit to Great Britain Patent Application No. 2001259.7, filed on Jan. 30, 2020, and to Great Britain Patent Application No. 2001260.5, filed on Jan. 30, 2020. The International Application was published in English on Aug. 5, 2021 as WO 2021/154092 A1 under PCT Article 21(2).

FIELD

The present invention relates to a high-voltage AC transmission system for power transmission to an offshore plant from an onshore plant. The system is adapted to prevent/reduce an overvoltage when a sudden load drop occurs at the offshore plant. The present invention further relates to a method for preventing/reducing an overvoltage at sudden load drops in a high-voltage AC transmission system through a long cable, such as a submarine cable.

BACKGROUND

In high-voltage AC transmission systems transmitting a high load to remotely located users through long cables, there is a problem with a high voltage rise when the load suddenly drops with a high extent. This may, for example, be the case when the load requirements of the user are suddenly changed, for example, when a large machine or other power user is shut-off. Such users may, for example, be offshore platforms, desalination plants, fish farms, subsea factories, etc. This effect is further increased by the Ferranti effect due to high voltage and capacitive charging currents in the transmission cable.

One common method for reducing an overvoltage at sudden load drops at an offshore plant is to use reactive compensation methods, for example, Static Var Compensators (SVC) at the onshore power station. This method may work in some cases, but for longer transmission cables and/or high load drops, the load drop may lead to a voltage rise of such a magnitude that the SVC cannot reduce it to a low enough value at the remote offshore plant. One solution may be to install a higher number of compensating components that will increase the cost of the onshore power station. For longer transmission cables, SVCs at the onshore power station will further have a reduced effect on the voltage reduction when compared to an offshore compensation method. However, the use of offshore compensation is generally avoided due to weight and space constraints. Reactors on the topside could also be required to be shut down (depending on its ATEX certification or Ex-rating for zone 2 or zone 1 typically) in case of a situation where there is a gas leak on the platform or other hazardous situations.

SUMMARY

An aspect of the present invention is to provide improved systems and methods for preventing/reducing an overvoltage at load drops in high-voltage AC transmission systems.

In an embodiment, the present invention provides an AC transmission system for a power transmission to an offshore plant. The AC transmission system includes an onshore power station which is configured to transmit an electric power, an offshore plant which is configured to receive the electric power, a submarine cable which connects the onshore power station to the offshore plant, and at least one pipeline which comprises an electrical heating system which is configured to be connected to the onshore power station through the submarine cable.

BRIEF DESCRIPTION OF THE DRAWINGS

The present invention is described in greater detail below on the basis of embodiments and of the drawings in which.

DETAILED DESCRIPTION

In an embodiment, the present invention provides an AC transmission system for power transmission to an offshore plant, comprising an onshore power station adapted to transmit electric power, an offshore plant adapted to receive electric power, and a submarine cable connecting the onshore power station to the offshore plant, wherein the system further comprises at least one pipeline provided with an electrical heating system, where the electrical heating system is adapted to be connected to the onshore power station through the submarine cable.

In an embodiment, the present invention provides a method for preventing/reducing an overvoltage in an AC transmission system adapted to transmit electric power from an onshore power station to an offshore plant through a submarine cable, the method comprising: transmitting a high power to the offshore plant, monitoring the used power load at the offshore plant, and connecting an electrical heating system arranged in a submarine pipeline to the submarine cable to control the power factor of the transmission system.

In an embodiment, the present invention provides an AC transmission system for power transmission to an offshore plant, comprising an onshore power station adapted to transmit electric power, an offshore plant adapted to receive electric power, and a submarine cable connecting the onshore power station to the offshore plant, wherein the system further comprises a wind power plant connected to the offshore plant, where the wind power plant is provided with a variable frequency drive, where the variable frequency drive is arranged to control a power factor of the AC transmission system.

In an embodiment, the present invention provides a method for preventing an overvoltage in an AC transmission system adapted to transmit electric power from an onshore power station to an offshore plant through a submarine cable, the method comprising: transmitting a high power to the offshore plant, monitoring the used power load at the offshore plant, and arranging a variable frequency drive of a wind turbine connected to the offshore plant to control the power factor of the transmission.

The detailed description below and the claims outline further embodiments.

Figure 1:
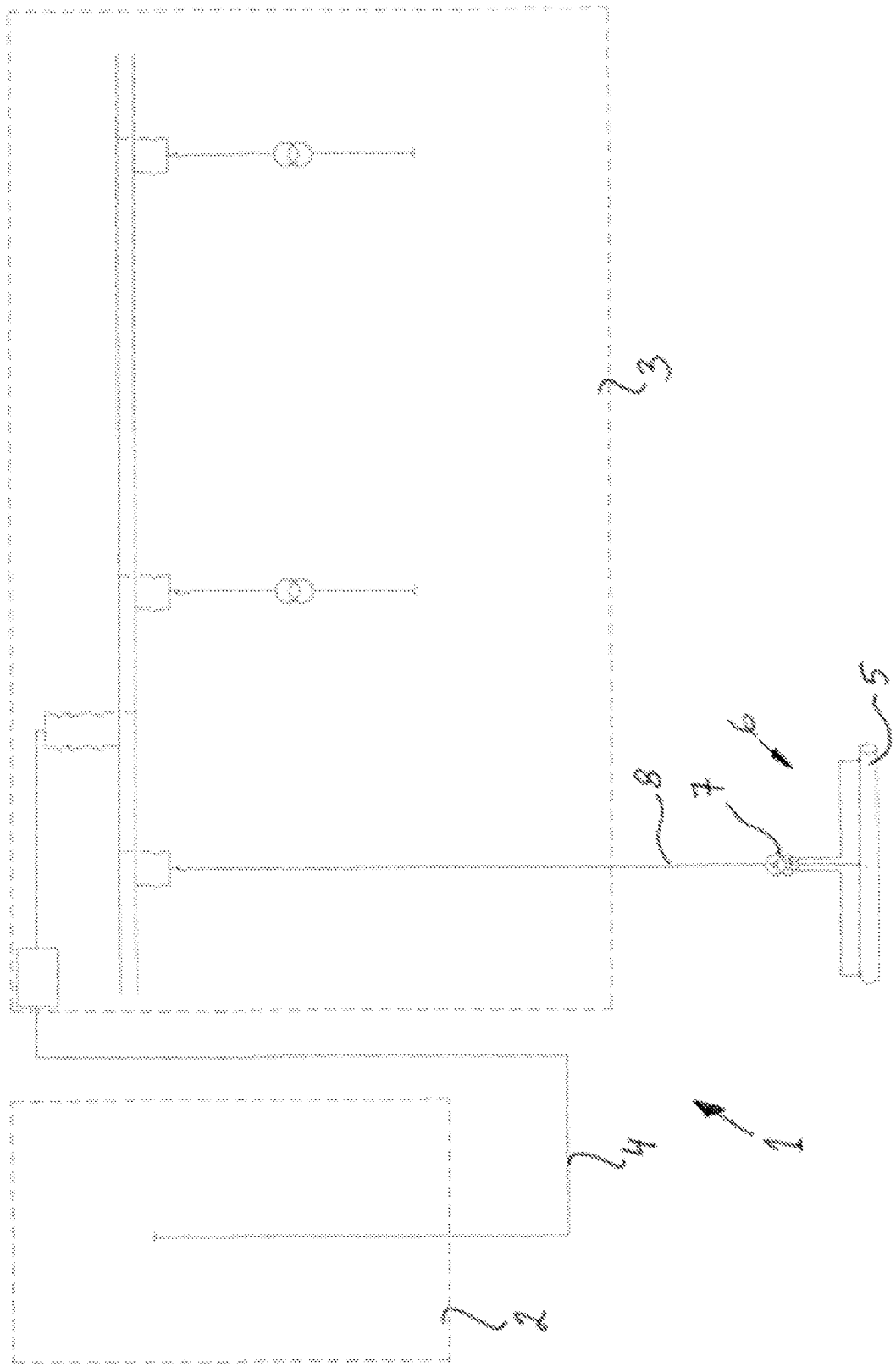
FIG. 1 shows a schematic view of an AC transmission system according to an embodiment of the present invention.
Figure 2:
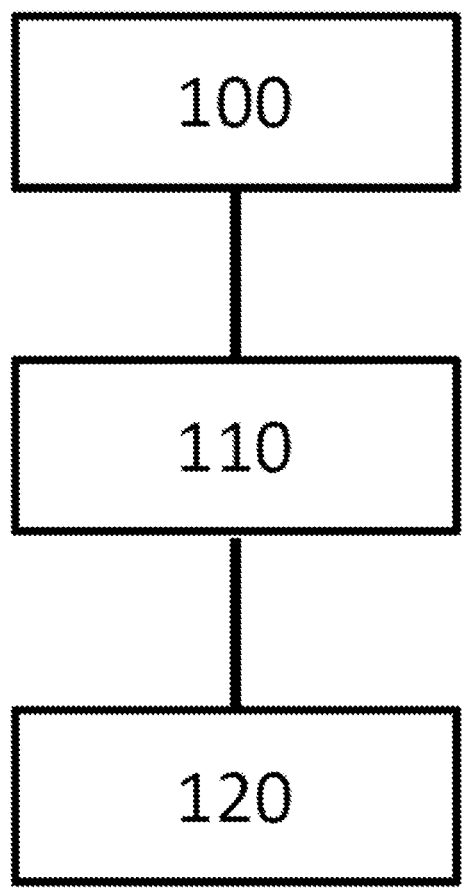
FIG. 2 shows a flow chart of a method to prevent an overvoltage according to an embodiment of the present invention.

In a first aspect, described in relation to FIGS. 1-2, there is provided a high-voltage AC transmission system and a method for preventing/reducing an overvoltage in a high-voltage AC transmission system.

In an AC transmission system for power transmission to an offshore plant, comprising an onshore power station adapted to transmit electric power, an offshore plant adapted to receive electric power, and a submarine cable connecting the onshore power station to the offshore plant, the system may further comprise at least one pipeline provided with an electrical heating system which is adapted to be connected to the onshore plant through the submarine cable when an overvoltage is detected.

The power factor of the AC transmission system can be compensated by the use of an electrical heating system of a pipeline, where the electrical heating system is connected to the AC transmission system when an overvoltage is detected. By connecting an electrical heating system to the power receiving point of the AC transmission system, the reactive current of the system can be compensated for by the use of the electrical heating system, which mainly loads the system with an inductive component. The submarine cable on the other hand mainly gives rise to a capacitive component. The power factor is thereby compensated for at the offshore plant, where the overvoltage will occur, and there may not be a need to install SVC equipment at the offshore plant.

The AC transmission system is a high load, high voltage transmission system comprising a long submarine cable. The AC transmission system is in one example able to transmit at least 1 MW at a voltage of over 76 kV, and the cable is at least 100 km long. The electrical heating system may comprise one or more tie-in pipelines, which leads oil and/or gas from a subsea well to the offshore platform. An electrical heating system on a pipeline is used to prevent hydrate and wax formation in subsea transport flow lines that will cause undesired fluid properties and may block the flow in the pipeline. The electrical heating system of one or more pipelines may be connected to the submarine cable when an overvoltage is detected. The number of connected pipelines may depend on the level of the overvoltage.

The electrical heating system is in one example a direct electrical heating (DEH) system. In such a system, the current is fed directly through the pipeline, which must be conductive. The single-phase AC power supply connects the phase at one end of the pipeline and the neutral at the other end, and the current through the pipeline will heat the pipeline. The pipeline is insulated and is provided with a conductor on the outside.

The electrical heating system may also be an induction heating, either with a standard 3-phase transformer or with a special 3-to-2-phase transformer interface to the voltage level of the long AC power cable. Both an electrical heating based on Pipe-in-Pipe installations with an inductive power factor and inductive skin effect heating or an induction tube heating system could also be used to provide a power factor compensation.

A side effect is that the direct electrical heating system and/or the induction heating system will compensate some of the capacitance in the long AC power cable if it is connected in normal operation and it can in this case contribute to lower transmission losses.

In a method for preventing/reducing an overvoltage in an AC transmission system adapted to transmit electric power from an onshore power station to an offshore plant through a submarine cable, the present invention includes the steps of: transmitting a high power to the offshore plant, monitoring the used power load at the offshore plant, and connecting an electrical heating system arranged in a submarine pipeline when a significant power load drop is detected. A significant power load drop is a load drop that will give a certain voltage increase and is, for example, dependent on the actual power consumption and on the dimensions of the submarine cable, for example, the internal resistance of the submarine cable. A significant power load drop may in one example be at least a 20% load drop, and in another example at least a 30% or a 50% load drop. A significant load drop may give rise to a voltage increase of at least 10%, which may be harmful to the installed equipment.

By this method, an overvoltage caused by a large power load drop can be prevented or reduced to a safe level. By connecting an electrical heating system of a pipeline to the offshore plant, the inductive nature of the electrical heating system can be used to compensate the power factor of the transmission system, and can thus reduce the induced overvoltage, so that the overvoltage caused by the reactive power in the AC transmission system can be compensated for.

FIG. 1 shows a schematic view of an AC transmission system. The AC transmission system 1 comprises an onshore power station 2 that is adapted to supply an offshore plant 3 with electricity. The offshore plant 3 is a plant arranged offshore that requires a high amount of electric energy and may, for example, be an offshore platform which is adapted to drill for and/or produce, store or offload oil and/or gas, a desalination plant, a fish farm, a subsea factory, etc. The offshore plant is connected to the onshore power station through a submarine cable 4 which is adapted to transmit the required energy. In one example, the submarine cable 4 is, for example, arranged to transmit several MW or more at a high voltage of, for example, 76 kV or more, and the submarine cable may, for example, be a 3-phase cable having a 300 mm$^2$ core of cupper and having a length of, for example, 162 km. The offshore plant may also be a small island supplied with electricity from the mainland.

The onshore power station is mainly adapted to supply electric energy to the offshore plant, but may also receive electric energy from the offshore plant, for example, if the offshore plant sometimes produces more energy than it consumes, or if the submarine cable is also connected to a wind power plant or a solar panel array.

The offshore plant, which is an offshore drill platform in the shown example, comprises several different machines that consume electric energy. Some of these loads are relatively large and will thus consume a considerable amount of current. When such a load is suddenly shut off or disconnected, the reactive energy in the long submarine cable will induce an overvoltage in the transmission system, which may damage other equipment still connected to the transmission system. The amount of the overvoltage depends, for example, on the amount of the load decrease, the time duration of the load decrease, and the length and construction of the submarine cable. The system may also comprise step-up transformers. Some equipment may be shut off in a controlled slow and gentle way, but other equipment may be shut off instantaneously.

In order to prevent or at least reduce the induced overvoltage at a sudden load drop, the system further comprises a pipeline 5 provided with an electrical heating system 6. The pipeline 5 is a flow line connecting a subsea well with the platform. The electrical heating system 6 is arranged to prevent the formation of hydrate and wax in the flow line, which may reduce or prevent the flow inside the conduit.

The electrical heating system 6 is connected to the platform through a submarine cable 8 adapted to supply electrical power to the electrical heating system 6 when required.

A production pipeline provided with an electrical heating system of the direct electrical heating (DEH) type is normally supplied from a symmetry-providing system of transformers, capacitors and reactors on the topside of the offshore platform. By supplying the DEH circuit directly by using a 3-to-2-phase transformer, it will function in approximately the same way as an offshore reactor. By arranging both the pipeline-interfaces and the transforming equipment on the seabed, away from the topside of the offshore platform, this equipment must not be shut down when there is a hazardous situation such as a gas leakage on the platform topside. The reactive compensation can thereby be used at all times, which topside reactors cannot. The electrical heating system can thus be used as an offshore/subsea reactor and can be energized during a sudden load drop. In this way, it can contribute to a reduced voltage rise since its active and reactive power consumption increases with the square of the voltage applied. With respect to voltage rise reduction, the reactive (inductive) power consumption of the electrical heating system is especially effective to counteract the capacitive effects in the remote end of a long subsea AC power cable.

Other flow line heating solutions with an inductive power-factor will typically provide similar dampening of capacitive driven voltage rise effects, for example, induction heating of flow lines would be a relevant example in this respect both with standard 3-phase transformer and more special 3-to-2-phase transformer interfaces to the voltage level of the long AC power cable. Both electrical flow line heating based on Pipe-in-Pipe installations with an inductive power factor and inductive skin effect heating or induction tube heating systems could additionally be used to provide similar dampening of capacitive driven voltage rise effects at a scale comparable to their typical normal power demand. A side effect is that the DEH and/or induction heating in normal operation will compensate some of the capacitance in the long AC power cable and can therefore contribute to lower transmission losses in the transmission system.

With the AC transmission system, the voltage stability can be increased and the reactive power flow can be reduced by using the electrical heating system of the pipeline to control the power factor of the transmission system. An overvoltage due to random shutdowns or load drops at the remote end of the submarine cable, where an onshore power plant is connected, for example, to an offshore platform supplied with power from the onshore power plant, can thereby be prevented or reduced significantly, which will help to protect the installation against transient overvoltage and surges.

A method for preventing an overvoltage in an AC transmission system 1 adapted to transmit electric power from an onshore power station 2 to an offshore plant 3 through a submarine cable 4, may comprise the following steps.

In step 100, high power is transmitted to the offshore plant through the submarine cable. The power may, for example, be 1 MW or more, at a voltage of, for example, 76 kV or more. The length of the cable may, for example, be 100 km or more. With a short cable or a low power transmission, a problem with induced overvoltage will not occur or will be relatively low, so that the installed equipment will not be broken or destroyed.

In step 110, the used power and/or the actual voltage is monitored at the offshore plant. The used power may be determined by measuring the actual current and voltage, or only the voltage may be measured.

In step 120, a significant power load drop is determined or anticipated. This load drop may be estimated by measuring the actual current and voltage, or by measuring the voltage increase. When the power load drop is determined, an electrical heating system of a pipeline is connected to the submarine cable, so that the induced overvoltage is reduced or prevented. It is also possible to measure a voltage increase, and when a significant voltage increase, which may, for example, be more than 10% or more is determined, the electrical heating system is connected to the submarine cable.

It is also possible that a central control system initiates a power load drop for some reason. In this case, the control system can give a pre-warning to the control system of the offshore plant. If the anticipated power load drop is significant, the power factor of the transmission system may be adjusted in advance.

A significant power load drop is a load drop that will give a certain voltage increase and is, for example, dependent on the actual power consumption and on the dimensions of the submarine cable, for example, the internal resistance of the submarine cable. A significant power load drop may in one example be at least a 20% load drop, and in another example at least a 30% or a 50% load drop. A significant load drop may give rise to a voltage increase of at least 10% or 20% or more, which may be harmful to the installed equipment. Depending on the installed equipment, the allowed significant load drop or voltage increase can be determined.

The electrical heating system may optionally be "permanently" connected (and adjusted to a suitable level of continuous heating), the direct electric heating system (DEH) having an inductive power factor (for example, in the range around 0.2 or 0.3 for a DEH system) when connected through a 3-to-2 phase transformer. For example, a long subsea AC-power cable step-out based electrical system with the described DEH system in the offshore end may provide a voltage level stabilizing effect without any specific control system. The effect of the reactive power flow and the flow directions in a long AC-power cable onshore or subsea may stabilize/dampen the voltage variations in relation to a voltage applied in the offshore end on the connected 3-to-2-phase DEH installation. This may provide a rapid voltage level stabilization effect.

The system and method may be adapted to prevent significant power load drops to cause a high voltage increase that will damage installed equipment on the offshore plant. It may also be suitable for compensating for smaller voltage increases, in the range between 5-10%, which will not damage the installed equipment. Such power factor compensation can, for example, reduce the transmission losses through the submarine cable.

Figure 3:
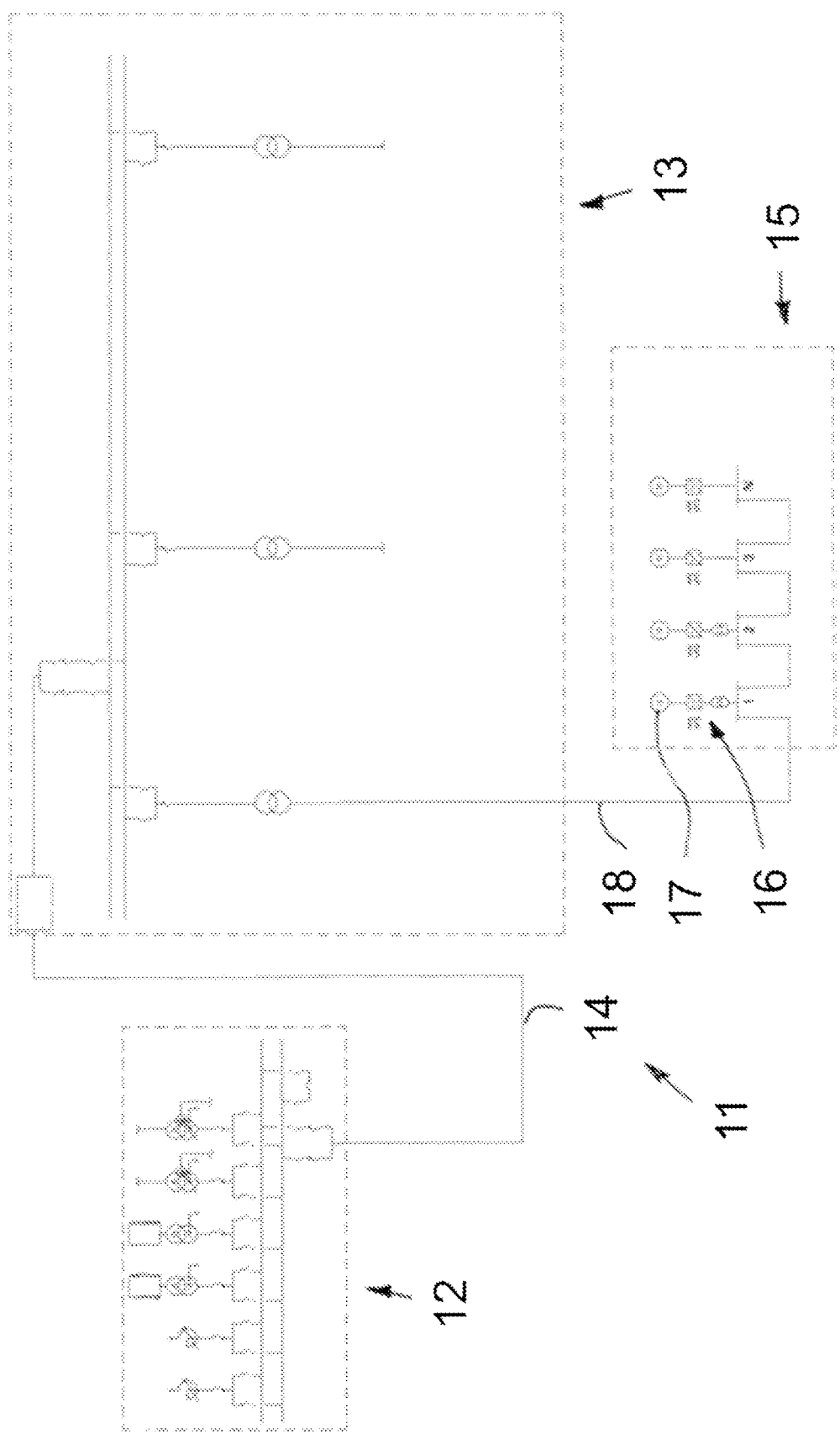
FIG. 3 shows a schematic view of an AC transmission system according to an embodiment of the present invention.
Figure 4:
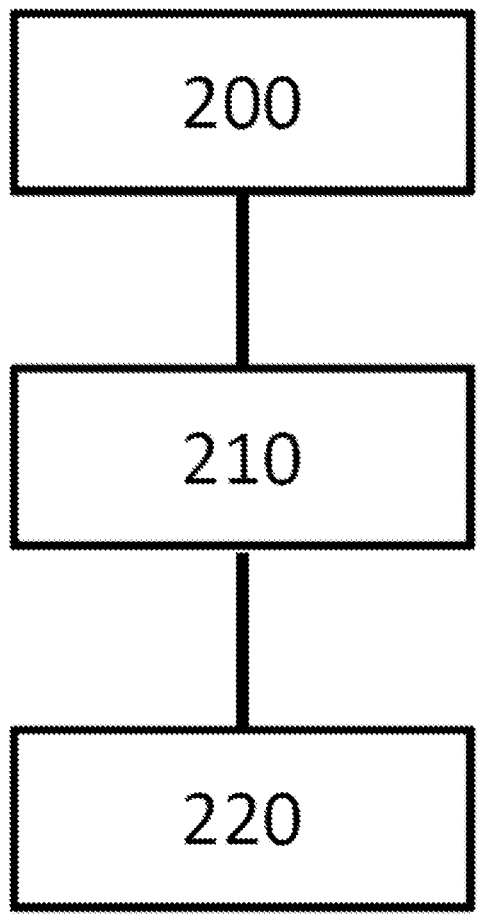
FIG. 4 shows a flow chart of a method to prevent an overvoltage according to an embodiment of the present invention.

In a second aspect, described in relation to FIGS. 3-4, the present invention provides a high-voltage AC transmission system and a method for preventing an overvoltage in high-voltage AC transmission systems.

In an AC transmission system for power transmission to an offshore plant, comprising an onshore power station adapted to transmit electric power, an offshore plant adapted to receive electric power, and a submarine cable connecting the onshore power station to the offshore plant, the system may further comprise a wind power plant connected to the offshore plant, where the wind power plant is provided with a variable frequency drive, where the variable frequency drive is arranged to control a power factor of the system.

The power factor of the AC transmission system can be controlled by the use of a variable frequency drive arranged at a wind turbine plant. By connecting a wind power plant to the offshore plant, the existing variable frequency drives of the wind turbines of the wind power plant can be used to control the power factor in the transmission system. The power factor is thereby controlled at the offshore plant, where the overvoltage will occur, and there may not be a need to install SVC equipment at the offshore plant.

The AC transmission system is a high load, high voltage transmission system comprising a long submarine cable. The AC transmission system is in one example able to transmit at least 1 MW at a voltage of over 76 kV, and the cable is at least 100 km long. The wind power plant will advantageously comprise a plurality of wind turbines. The number of wind turbines and the rated power of each wind turbine is also important for the possibility to control the power factor of the AC transmission system. The total power of the wind power plant can be balanced to the rating of the AC transmission system.

The variable frequency drive (VFD) is used to control the power factor and thus the resulting reactive power consumption, which may be either inductive or capacitive. An increase in voltage thereby leads to an increase in inductive current of the grid-interfacing part of the VFD. The amount of available reactive power consumption of a VFD can be calculated, and the size of a VFD of a wind turbine may be adapted to the required power factor compensation. The installation of a slightly larger VFD at the wind turbine may thus be enough for handling the power factor compensation of the system.

A further advantage of using a VFD of a wind turbine to control the power factor of a transmission system is that, at low loads at the offshore plant, it would be possible to decrease the transmission losses by setting the VFD to a low, inductive power factor.

In one example, the variable frequency drive of the wind turbine is an active front-end variable frequency drive with 4-quadrant capabilities. This will simplify the control of the power factor and will increase the efficiency.

In a method for preventing an overvoltage in an AC transmission system adapted to transmit electric power from an onshore power station to an offshore plant through a submarine cable, the present invention includes the steps of: transmitting a high power to the offshore plant, monitoring the used power load at the offshore plant, and arranging a variable frequency drive of a wind turbine connected to the offshore plant to control the power factor of the transmission when a significant power load drop is detected. A significant power load drop is a load drop that will give a certain voltage increase and is, for example, dependent on the actual power consumption and on the dimensions of the submarine cable, for example, the internal resistance of the submarine cable. A significant power load drop may in one example be at least a 20% load drop, and in another example at least a 30% or a 50% load drop. A significant load drop may give rise to a voltage increase of at least 10%, which may be harmful to the installed equipment.

By this method, overvoltage caused by a large power load drop can be prevented or reduced to a safe level. By connecting a wind power plant to the offshore plant, the VFD's of the wind turbines of the wind power plant can be used to control the power factor of the AC transmission system so that the overvoltage caused by the reactive power in the AC transmission system can be compensated for.

FIG. 3 shows a schematic view of an AC transmission system. The AC transmission system 11 comprises an onshore power station 12 that is adapted to supply an offshore plant 13 with electricity. The offshore plant 13 is a plant arranged offshore that requires a high amount of electric energy and may, for example, be an offshore platform which is adapted to drill for and/or produce, store or offload oil and/or gas, a desalination plant, a fish farm, a subsea factory, etc. The offshore plant 13 is connected to the onshore power station 12 through a submarine cable 14, which is adapted to transmit the required energy. In one example, the submarine cable 14 is, for example, arranged to transmit several MW or more at a high voltage of, for example, 76 kV or more, and the submarine cable 14 may, for example, be a 3-phase cable having a 300 $mm^2$ core of cupper and having a length of, for example, 162 km. The offshore plant 13 may also be a small island supplied with electricity from the mainland.

The onshore power station can be mainly adapted to supply electric energy to the offshore plant, but may also receive electric energy from the offshore plant, for example, if the offshore plant sometimes produces more energy than it consumes, or if the submarine cable can also be connected to a wind power plant or a solar panel array.

The offshore plant, which is an offshore drill platform in the shown example, comprises several different machines that consume electric energy. Some of these loads are relatively large and will thus consume a considerable amount of current. When such a load is suddenly shut off or disconnected, the reactive energy in the long submarine cable may induce an overvoltage in the transmission system, which may damage other equipment still connected to the transmission system. The amount of the overvoltage depends, for example, on the amount of the load decrease, the time duration of the load decrease, and the length and construction of the submarine cable. The system may also comprise step-up transformers. Some equipment may be shut off in a controlled slow and gentle way, but other equipment may be shut off instantaneously.

In order to prevent or at least reduce the induced overvoltage at a sudden load drop, the system further comprises a wind power plant 15 connected to the offshore plant 13. The wind power plant 15 advantageously comprises a plurality of wind turbines 17 and can, for example, be a wind farm arranged relatively close to the offshore plant 13. The wind power plant 15 is connected to the offshore plant 13 through a submarine cable 18. The number of wind turbines 17 and the rated power of each wind turbine 17 may vary. Each wind turbine 17 is further provided with a variable frequency drive 16 which is adapted to convert the AC voltage and frequency created by the wind turbine to the voltage and frequency of the grid to which the wind turbine is connected. The AC voltage may also be converted to a suitable voltage by a step-up transformer. The variable frequency drive 16 can, for example, be of the active front-end (AFE) variable frequency drive type comprising a 4-quadrant technology.

The active front-end variable frequency drive of the wind turbine interface is used to control the power factor and the resulting reactive power consumption, which may be either inductive or capacitive, when an overvoltage is detected. The voltage and current of the transmission system are measured at the offshore platform, and when a voltage increase and/or current decrease is detected, the variable frequency drive is controlled to compensate the reactive power. An increase in the voltage level will thus lead to an increasing inductive current of the grid-interfacing part of the VFD.

Depending on the power rating of the VFD of a wind turbine compared to the power rating of the wind turbine, and the actual use of a VFD, the available reactive compensation power that can be delivered by a VFD may vary. The maximum overvoltage of the transmission system, i.e., the maximum load drop, may be estimated and may be compared with the estimated maximum available reactive compensation power of the wind power plant. If the wind power plant is large, the reactive compensation power may suffice to compensate for the estimated worst case. If the estimated worst case exceeds the available reactive compensation power of the wind power plant, it may be of advantage to increase the rating of the VFDs of the wind power plant. To increase the VFDs of the wind power plant somewhat can be more cost effective than to adding additional compensating equipment onshore or offshore.

When the equipment of the offshore platform is only using a relatively low amount of current, i.e., when the load is relatively low, the VFDs may also be used to create a low, inductive power factor that may decrease the transmission losses in the transmission system.

With the AC transmission system, the voltage stability can be increased and the reactive power flow can be reduced by using the active front-end variable frequency drives of the wind turbines to control the power factor of the transmission system. An overvoltage due to random shutdowns or load drops at the remote end of the submarine cable, where an onshore power plant is connected to, for example, an offshore platform supplied with power from the onshore power plant, can thereby be prevented or reduced significantly, which will help to protect the installation against transient overvoltage and surges.

A method for preventing an overvoltage in an AC transmission system 11 adapted to transmit electric power from an onshore power station 12 to an offshore plant 13 through a submarine cable 14 comprises the following steps.

In step 200, high power is transmitted to the offshore plant through the submarine cable. The power may, for example, be 1 MW or more, at a voltage of, for example, 76 kV or more. The length of the cable may, for example, be 100 km or more. With a short cable or a low power transmission, a problem with induced overvoltage will not occur or will be relatively low, so that the installed equipment will not be broken or destroyed.

In step 210, the used power and/or the actual voltage is monitored at the offshore plant. The used power may be determined by measuring the actual current and voltage, or only the voltage may be measured.

In step 220, a significant power load drop is determined or anticipated. This load drop may be estimated by measuring the actual current and voltage, or by measuring the voltage increase. When the power load drop is determined, a variable frequency drive 16 of a wind turbine 17 connected to the offshore plant 13 is arranged to control the power factor of the transmission system, so that the induced overvoltage is reduced or prevented. It is also possible to measure a voltage increase, and when a significant voltage increase, which may, for example, be more than 10% or more is determined, the VFDs of the wind power plant 15 is controlled to compensate the induced reactive power.

It is also possible to that a central control system initiates a power load drop for some reason. The control system can in this case give a pre-warning to the control system of the offshore plant. If the anticipated power load drop is significant, the power factor of the transmission system may be adjusted in advance.

A significant power load drop is a load drop that will give a certain voltage increase and is, for example, dependent on the actual power consumption and on the dimensions of the submarine cable, for example, the internal resistance of the submarine cable. A significant power load drop may in one example be at least a 20% load drop, and in another example at least a 30% or a 50% load drop. A significant load drop may give rise to a voltage increase of at least 10% or 20% or more, which may be harmful to the installed equipment. Depending on the installed equipment, the allowed significant load drop or voltage increase can be determined.

The system and method may be adapted to prevent significant power load drops to cause a high voltage increase that will damage installed equipment on the offshore plant. It is also suitable for compensating for smaller voltage increases, in the range between 5-10%, which will not damage the installed equipment. Such power factor compensation may, for example, reduce the transmission losses through the submarine cable.

The present invention is not to be regarded as being limited to the embodiments described above, a number of additional variants and modifications being possible within the scope of the subsequent patent claims. The AC transmission system may have any size and configuration, and may comprises one or more offshore platforms. Reference should also be had to the appended claims.

LIST OF REFERENCE NUMERALS

1 High-voltage AC transmission system
2 Onshore power station
3 Offshore plant
4 Submarine cable
5 Pipeline
6 Electrical heating system
7 3-to-2 phase transformer
8 Submarine cable
11 High-voltage AC transmission system
12 Onshore power station
13 Offshore plant
14 Submarine cable
15 Wind power plant
16 Variable frequency drive
17 Wind turbine
18 Submarine cable

The invention claimed is:

1. An AC transmission system for a power transmission to an offshore plant, the AC transmission system comprising:
   an onshore power station which is configured to transmit an electric power;
   an offshore plant which is configured to receive the electric power;
   a first subsea cable which connects the onshore power station to the offshore plant; and
   at least one pipeline which comprises an electrical heating system, the electrical heating system of the at least one pipeline being connected to the offshore plant via a second subsea cable and being connected to the onshore power station through each of the first subsea cable and the second subsea cable via the offshore plant.

2. The AC transmission system as recited in claim 1, wherein the electrical heating system is configured to be connected to the onshore power station through the first subsea cable when a significant power load drop or a significant overvoltage is detected or anticipated.

3. The AC transmission system as recited in claim 1, wherein the offshore plant is an offshore drill platform.

4. A method for preventing/reducing an overvoltage in an AC transmission system which is configured to transmit an electric power from an onshore power station to an offshore plant through a first subsea cable, the method comprising:

transmitting a high power to the offshore plant;
monitoring a used power load at the offshore plant; and
connecting an electrical heating system to the offshore plant via a second subsea cable and connecting the electrical heating system to the onshore power station through each of the first subsea cable and the second subsea cable via the offshore plant so as to control a power factor of the AC transmission system.

5. The method as recited in claim 4, further comprising:
detecting or anticipating a significant power load drop or a significant voltage increase prior to connecting the electrical heating system which is arranged in a subsea pipeline to the first subsea cable so as to control the power factor of the AC transmission system.

6. The method as recited in claim 5, wherein the offshore plant is an offshore drill platform.

7. An AC transmission system for a power transmission to an offshore plant, the AC transmission system comprising:
an onshore power station which is configured to transmit an electric power;
an offshore plant which is configured to receive the electric power;
a first subsea cable which connects the onshore power station to the offshore plant; and
a wind power plant which is connected to the offshore plant via a second subsea cable and which is connected to the onshore power station through each of the first subsea cable and the second subsea cable via the offshore plant, the wind power plant comprising at least one variable frequency drive which is configured to control a power factor of the AC transmission system.

8. The AC transmission system as recited in claim 7, wherein the at least one variable frequency drive is an active front-end variable frequency drive.

9. The AC transmission system as recited in claim 7, wherein the first subsea cable is at least 100 km long.

10. The high-voltage AC transmission system as recited in claim 7, wherein the offshore plant is an offshore platform for oil/gas extraction.

* * * * *